UNITED STATES PATENT OFFICE.

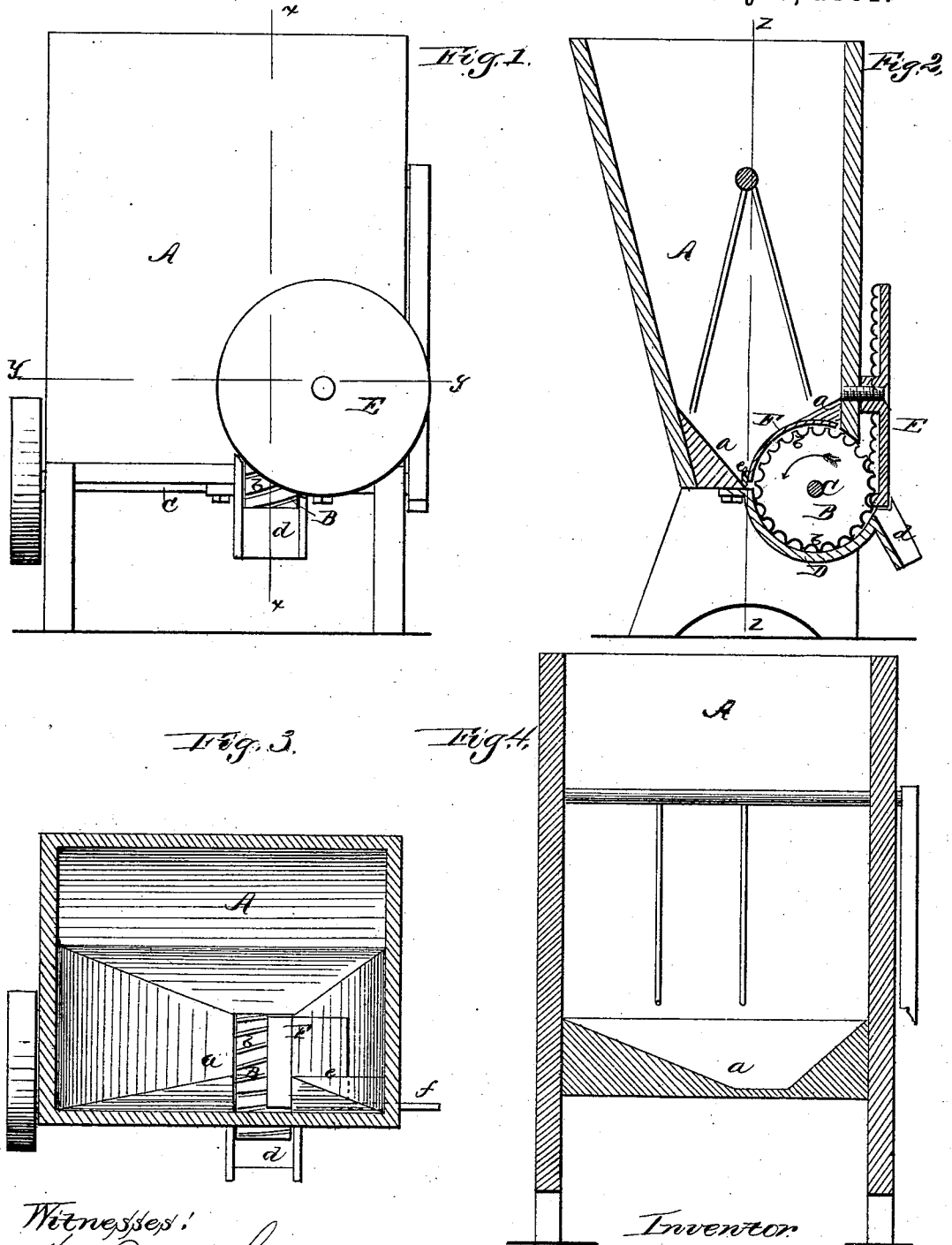

GEORGE N. JOSS, OF NEW PHILADELPHIA, OHIO.

FERTILIZER-DISTRIBUTER.

SPECIFICATION forming part of Letters Patent No. 243,916, dated July 5, 1881.

Application filed May 16, 1881. (Model.)

*To all whom it may concern:*

Be it known that I, GEORGE N. JOSS, of New Philadelphia, in the county of Tuscarawas and State of Ohio, have invented certain new and useful Improvements in Fertilizer-Distributers; and I do hereby declare that the following is a full, clear, and exact description thereof, reference being had to the acccompanying drawings, and to the letters of reference marked thereon, which form part of this specification.

This invention relates to a fertilizer-distributer for attachment to a seed-drill, its object being to secure uniform force-feed distribution of the fertilizer in regulated quantity.

To this end it consists in the novel construction and arrangement of the devices which will be hereinafter particularly described.

In the accompanying drawings, Figure 1 is a front view of the distributer constructed according to my invention. Fig. 2 is a vertical section on line $x\ x$, Fig. 1. Fig. 3 is a horizontal section on line $y\ y$, Fig. 1; and Fig. 4 is a vertical section on line $z\ z$, Fig. 2.

The letter A denotes the hopper, provided with a suitable base, by which it may be attached to the frame of the drill. This hopper has its bottom inclined inwardly and downwardly from its sides to a central opening, and the lower edges of the two portions of the bottom $a$ are curved to about correspond to the periphery of the feed-wheel B, which is mounted on a shaft, C, journaled in bearings directly under the bottom, and has its projecting end provided with a belt-pulley (or it may be with a gear-wheel) for connection with suitable motive devices of the drill. The feed-wheel B has a broad periphery, which is grooved obliquely, the grooves being separated by oblique ribs $b$. A portion of the wheel extends below the bottom of the hopper, and is incased in a cup, D, secured to the bottom of the hopper, and provided with delivery-spout $d$. The ribs $b$ of the feed-wheel project a little to the front of the hopper-bottom and engage with the teeth of a crown-gear, E, which is journaled to the front wall of the hopper and extends entirely across the face of the feed-wheel.

Under one of the portions $a$ of the bottom of the hopper is arranged a sliding gate, F, having a curved shape to fit over that portion of the periphery of the feed-wheel which coincides with the opening in the bottom of the hopper. This sliding gate is supported by suitable guides, $e$, and is provided with an operating-rod, $f$, which projects through the side wall of the hopper. The object of this sliding gate is to regulate the quantity of the fertilizer which the feed-wheel carries from the hopper. Any suitable device may be used for agitating the fertilizer in the hopper.

The operation of the invention is as follows: The fertilizer being placed in the hopper and the gate opened to the desired extent, the turning of the feed-wheel in the direction indicated by the arrow causes that portion of the fertilizer which settles in the grooves of said wheel to be carried out of the hopper to the delivery-spout. The ribs of the feed-wheel acting upon the crown-gear E causes it to turn, and the teeth of said gear successively traverse the entire length of the grooves of the feed-wheel, thoroughly removing the fertilizer therefrom and causing it to fall on the feed-spout, so that an effective force-feed operation of the feed-wheel is guaranteed.

I am aware that it is not new to employ a clearing-wheel in connection with a feed or delivery wheel, and therefore do not claim such, broadly, as my invention.

What I claim as my invention is—

The combination, with a hopper having its bottom inclined inwardly and downwardly to a central opening, of the feed-wheel B, constructed with oblique ribs $b\ b$, and arranged to project beyond the front of the hopper, and crown-wheel E, journaled to the front wall, the axis of rotation of said wheel being at right angles to that of the feed-wheel, and its face extending across that of the feed-wheel, all substantially as and for the purpose set forth.

In testimony that I claim the foregoing as my own I affix my signature in presence of two witnesses.

GEORGE N. JOSS.

Witnesses:
NATHAN MORRIS,
LEWIS DESSAR.